(12) United States Patent
Ciulla et al.

(10) Patent No.: US 9,371,860 B2
(45) Date of Patent: Jun. 21, 2016

(54) HUB-BEARING ASSEMBLY FOR AGRICULTURAL USE

(71) Applicants: Luca Ciulla, Turin (IT); Ferdinando Patalacci, Rosta (IT)

(72) Inventors: Luca Ciulla, Turin (IT); Ferdinando Patalacci, Rosta (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/479,956

(22) Filed: Sep. 8, 2014

(65) Prior Publication Data

US 2015/0267753 A1    Sep. 24, 2015

(30) Foreign Application Priority Data

Sep. 6, 2013 (IT) ............................. TO2013A0720

(51) Int. Cl.
| | |
|---|---|
| *F16C 13/02* | (2006.01) |
| *F16C 35/07* | (2006.01) |
| *F16C 33/78* | (2006.01) |
| *F16C 33/72* | (2006.01) |
| *B60B 27/00* | (2006.01) |
| *B60B 27/02* | (2006.01) |
| *F16C 19/18* | (2006.01) |

(52) U.S. Cl.
CPC ......... *F16C 33/7886* (2013.01); *B60B 27/0073* (2013.01); *F16C 33/723* (2013.01); *B60B 27/0005* (2013.01); *B60B 27/02* (2013.01); *B60B 2310/305* (2013.01); *B60B 2900/211* (2013.01); *B60B 2900/511* (2013.01); *B60B 2900/5112* (2013.01); *B60B 2900/5114* (2013.01); *B60Y 2200/22* (2013.01); *F16C 19/184* (2013.01); *F16C 2310/00* (2013.01)

(58) Field of Classification Search
CPC ........................... F16C 33/723; F16C 2326/02
USPC .................. 384/460, 489, 537, 544, 589, 584
See application file for complete search history.

(56) References Cited

U.S. PATENT DOCUMENTS

| | | | | |
|---|---|---|---|---|
| 4,067,621 | A | | 1/1978 | Reppert |
| 5,711,617 | A | * | 1/1998 | Scheller ............... F16C 23/084 384/484 |
| 6,758,531 | B1 | * | 7/2004 | Bullard ..................... B60B 3/16 301/108.4 |
| 2003/0103701 | A1 | * | 6/2003 | Steinebach ........... F16C 35/045 384/489 |

FOREIGN PATENT DOCUMENTS

| | | | | |
|---|---|---|---|---|
| DE | 666703 | C | * 10/1938 | .............. B60B 37/10 |
| EP | 0185102 | A1 | 6/1986 | |
| EP | 1477329 | A1 | 11/2004 | |

* cited by examiner

*Primary Examiner* — Phillip A Johnson

(74) *Attorney, Agent, or Firm* — Bryan Peckjian; SKF USA Inc. Patent Dept.

(57) ABSTRACT

A hub-bearing assembly including a rolling bearing having an outer ring, at least an inner ring and at least a row of rolling bodies is provided. The rolling bearing including a housing containing the rolling bearing and having an annular cylindrical shape, the housing at one end forming a radial flange, a closing cap, assembled on the housing at the opposite end with respect to the end, where the housing forms the flange, the cap being cup shaped and having a bottom wall, transverse to the rolling bearing axis, and a side wall, constrained to the bottom wall. First assembly means provided on the housing external wall, the first assembly means being fixed and localized in angular correspondence with the ribs and cooperating with second assembly means, movable and realized on the internal surface of the side wall for assembling, in a dismantled way, the cap on the housing.

7 Claims, 2 Drawing Sheets

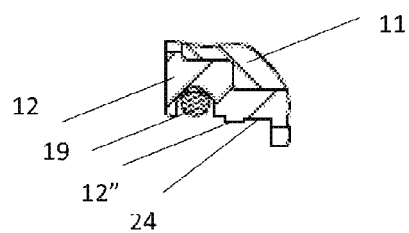
Fig. 3
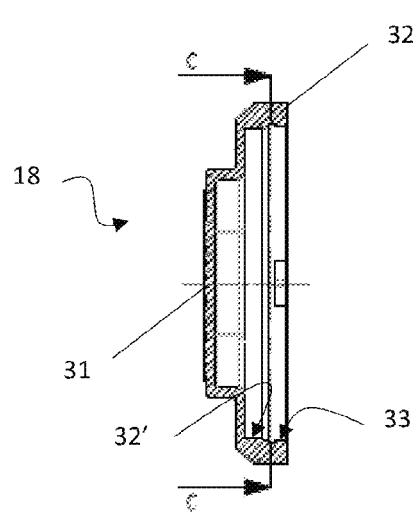
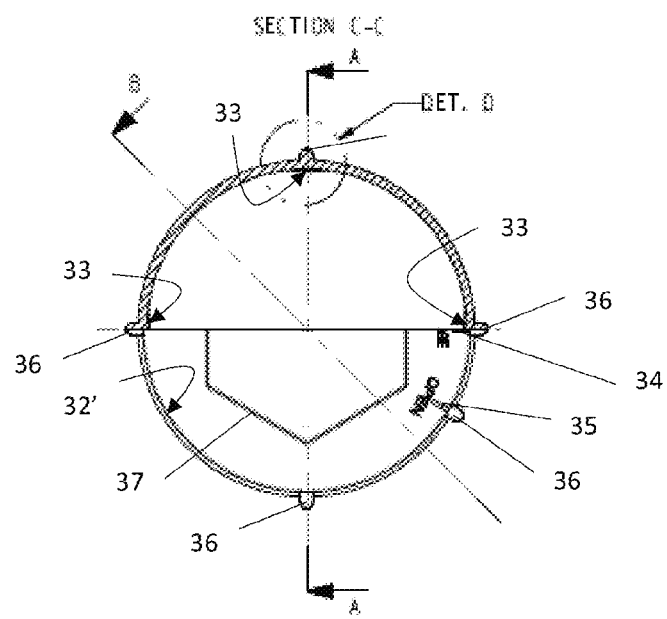
Fig. 4          Fig. 5

US 9,371,860 B2

HUB-BEARING ASSEMBLY FOR AGRICULTURAL USE

CROSS-REFERENCE TO RELATED APPLICATIONS

This application claims priority to Italian Patent Application No. TO2013A000720 filed Sep. 6, 2013, which is herein fully incorporated by reference.

TECHNICAL FIELD OF THE INVENTION

The present invention is related to a hub-bearing assembly for agricultural use, in particular the hub-bearing assembly is applied to an agricultural disc for fertilizer spreading on a cultivated land.

BACKGROUND OF THE INVENTION

In agriculture, devices are known in the shape of either smooth or toothed disc. By rotating due to land contact, such discs are able to dig groove on the land, to execute operations like ploughing, seeding, fertilizer spreading and other similar operations.

Usually, such discs are assembled side by side to correspondent shafts, which embossed protrude from the frame of an agricultural machine. Each disc is rotatable assembled, by means of a hub-bearing assembly, which comprises one or two radially inner rings, stationary, the inner rings steadily fixed to a central shaft, which embossed protrudes from an arm of the frame of an agricultural machine, a radially outer ring and a double row of balls, which is interposed between the outer ring and the inner rings. The inner rings, and consequently the bearing, are axially locked against the shoulder of the shaft, due to the tightening of a sleeve or a nut, which is screwed at a free end of the shaft. The outer ring can be contained in a housing, which is in one piece with an external radial flange, for assembling the disc. The housing is covered by a closing cap, which can be press-fit into the housing or screwed on it.

Document EP 1 477 329 A1 discloses a hubcap for a wheel hub. The hub is threaded and preferably includes several notches in its otherwise smooth radially outer end face. The hubcap has an open end terminating in a threaded end portion, a closed end and a discontinuous radial flange (72) between the ends. One or more latching tabs fit into the discontinuities in the flange, and each tab contains a projection which fits into the notch. The tab can be manually lifted to disengage the tab from the notch, but the hubcap cannot otherwise be unscrewed.

Of course, the assembly of the closing cap on the housing requires either a dedicated tooling for press-fit operations or, in case of screwed cap, suitable threads, namely an external thread for the housing and an internal thread for the closing cap. Independent on the chosen solution, additional machines and longer working time are required, thus leading to a long, difficult and expensive process. Moreover, considering the working environment, known solutions do not allow an easy disassembling of the cap.

SUMMARY OF THE INVENTION

Aim of the present invention is to realize a hub-bearing assembly for agricultural use, which overcomes the above mentioned inconveniences.

According to the present invention, a hub-bearing assembly is described, the hub-bearing assembly having the characteristics as in the enclosed independent claim.

Further embodiments of the invention, preferred and/or particularly advantageous, are described according to the characteristics as in the enclosed dependent claims.

BRIEF DESCRIPTION OF THE DRAWINGS

The invention will be now described by reference to the enclosed drawings, which show some non-limitative embodiments, namely:

FIG. 3 is a detail of the bearing housing, showing assembly means for assembling the closing cap;

FIG. 4 is a section of the closing cap for the hub-bearing assembly of FIG. 1;

FIG. 5 is a further view with a partial section of the closing cap of FIG. 4, showing assembly means and reference means with respect to the housing of FIGS. 2-3.

DETAILED DESCRIPTION OF THE INVENTION

Figure 1:
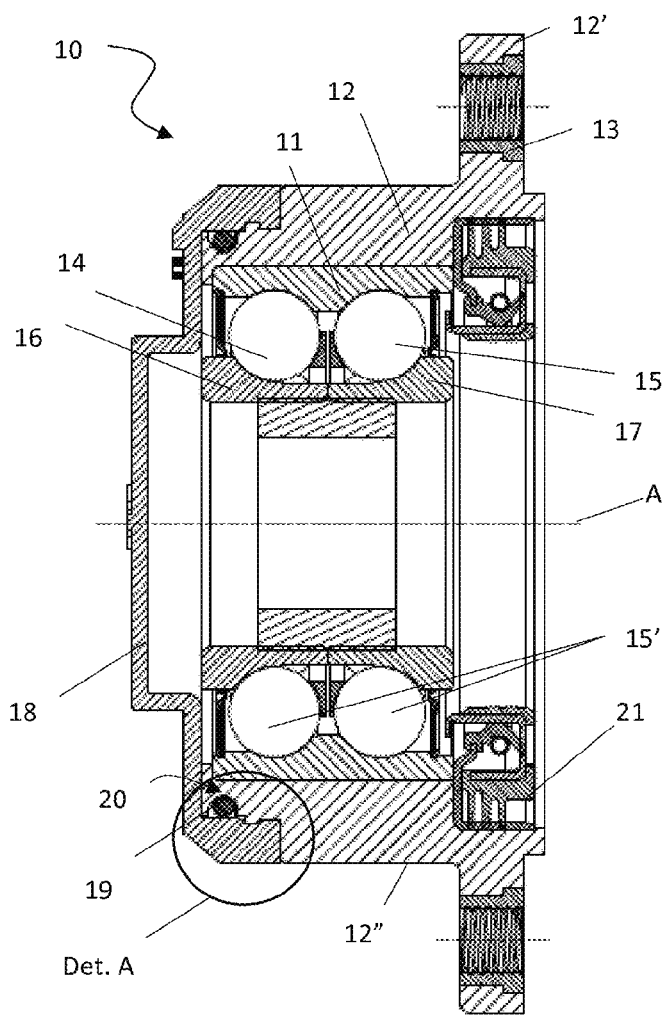
FIG. 1 is a section of the hub-bearing assembly, according to a preferred embodiment of the present invention.

With reference to FIG. 1, an embodiment of the invention is related to a hub-bearing assembly 10 for an agricultural disc, known and consequently not shown. The hub-bearing assembly comprises a rotatable radially outer ring 11, to whom in a radially external position a housing 12 is assembled, the housing being made of plastic material and possibly co-molded on the radially outer ring 11. At one end, the housing forms a radial flange 12' for assembling the disc by means of bolts (not shown), which are screwed in a plurality of threaded metal inserts 13. A double row 14, 15 of rolling bodies 15' (for example, balls) is interposed between the outer ring 11 and a pair of radially inner rings 16, 17, which are tightly and side by side assembled on a central shaft A, which embossed protrudes from an arm (also not shown) of the frame of the agricultural machine. The inner rings 16, 17 are axially tighten against a shoulder of the shaft A, by means of a nut, which is screwed at the free end of the shaft A. Such an assembly is known and for this reason is not shown in the drawings. At the opposite end, with respect to the end where the housing forms a flange 12', a closing cap 18 is assembled on the housing 12 and between the housing and the cap a sealing ring 19 is accommodated in a radial and circular groove 20 of the housing 12 and is compressed between the housing 12 and the cap 18, to ensure sealing against contaminants, entering the inner parts of the bearing.

A case sealing device 21 is located at the side of the hub bearing assembly 10, where the agricultural disc is assembled. The sealing device 21 is made of a rotatable portion and a stationary portion.

Figure 2:
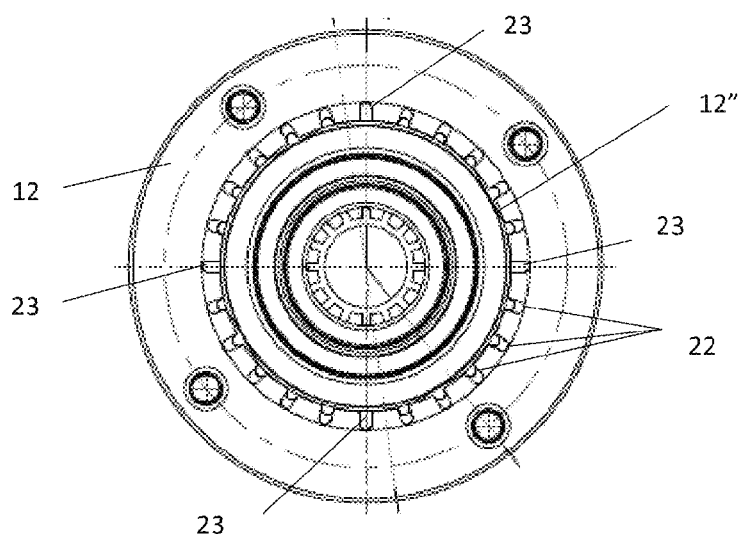
FIG. 2 is a view of the housing of FIG. 1, without the closing cap.

With reference to FIG. 2, the housing 12 has a substantially annular cylindrical shape, which, as already said, at one end forms the radial flange 12', while at the opposite end contains the seat 20 of the sealing ring 19. Between the flange end and the sealing ring seat, the external wall 12" of the housing shows a plurality of ribs 22, 23, angularly equally spaced each other. Almost all ribs 22 are axially tapered, with a maximum radial dimension close to the radial flange 12' of the housing 12 and a minimum radial dimension close to the opposite end of the housing, in other words the end containing the seat 20 of the sealing ring 19. Instead, the other ribs 23 show an axial cylindrical shape, in other words they have the same radial dimension all along their length. This let these ribs 23 be different form the other ribs 22 and the reason for this will be explained later. Preferably, these cylindrical ribs 23 are exactly in a number of four and are angularly equally spaced of 90° each other.

Thanks to the fact that the housing 12 is made of plastic material, as shown in FIG. 3, it is possible to provide the external wall 12" of the housing 12 with first assembly means 24 for assembling the closing cap 18, which is made of plastic material too, said assembling means 24 allowing the assembly, in a dismantled way, of the closing cap on the housing. Second and correspondent assembly means 33 are realized on the internal wall of the cap 18.

In fact, as shown in FIGS. 4 and 5, the cap is cup shaped and comprises a bottom wall 31, transversal to the rolling bearing axis and a side wall 32, which is constrained to the bottom wall and, along its internal surface 32', is provided with said second assembly means 33, movable, while fixed first assembly means 24 are realized in the housing 12 and angularly correspond to the cylindrical ribs 23.

Such first and second assembly means are realized as a bayonet fitting and, more in detail, they are a plurality of protrusions 33 on the internal surface 32' of the side wall 32 of the cap and correspondent recesses 24, along the external wall of the housing, below the seat 20 of the sealing ring 19. Both protrusions 33 of the cap 18 and recesses 24 of the housing 12 can have an angular amplitude of few degrees, for example 10°, are preferably in a number of four and angularly equally spaced of 90° each other.

The cap 18 is selectively rotatable around the bearing rotation axis A between an engagement position, which is defined by the cut "CLOSE" 34, position in which the cap 18 is solidly constrained to the housing 12, and a disassembly position, which is defined by the cut "OPEN" 35, position in which the cap 18 is axially detachable from the housing 12. The angular position of the cut "CLOSE" 34 corresponds to the angular position of one of the protrusions 33. The cap is also provided with reference external teeth 36, which are located in correspondence of the protrusions 33 and one of said teeth in correspondence of the cut "OPEN" 35. If the protrusions 33 are in a number of four, consequently the teeth will be in a number of five. The teeth 36 make easier the positioning of the cap on the housing, since the angular correspondence between cap teeth 36 and housing cylindrical ribs 23, in other words, the angular correspondence between recesses 24 of the housing 12 and protrusions 33 of the cap 18, is easy to be verified. Below, the engagement and dismantling operations of the cap 18 on the housing 12 are described. As already said, the housing 12 is provided with four cylindrical ribs 23, preferably angularly spaced of 90°. To execute the engagement operation, the cut "OPEN" 35 (and the correspondent tooth 36) is positioned in correspondence of a cylindrical rib 23 and the cap 18 is rotated by an angle suitable to put in correspondence the cut "CLOSE" 34 (and the correspondent tooth 36) with the same cylindrical rib, which was before in correspondence with the cut "OPEN" 35. In this way, the protrusions 33 on the internal surface of the side wall 32 of the cap 18 correspond to the recesses 24, along the external wall 12" of the housing, and the cap is locked on the housing. Advantageously, the angular distance between "OPEN" 35 and "CLOSE" 34 cut and, consequently, the rotation angle the cap must perform for the assembling is 30°.

Of course, for disassembling the cap, the operations shall be executed in the opposite way: the cap is rotated by the same angle but in the opposite direction, until the cut "OPEN" 35 of the cap 18 again corresponds with the cylindrical rib 23 of the housing 12. In this way, the protrusions 33 on the internal surface 32' of the side wall 32 of the cap 18 do not correspond anymore with the recesses 24, along the external wall of the housing, and the cap is unconstrained from the housing and can be taken away.

Advantageously, on the bottom wall 31 the cap is provided with a protruded hexagonal portion 37, for allowing a wrench to carry out engagement and disassembly operations of the cap 18 with respect to the housing 12.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A hub-bearing assembly comprising:
   a rolling bearing provided with an outer ring, at least an inner ring and at least a row of rolling bodies,
   a housing containing the rolling bearing and having an annular cylindrical shape, the housing at one end forming a radial flange and an external wall of the housing having a plurality of ribs, angularly equally spaced each other, some of such ribs having an axial cylindrical shape,
   a closing cap, assembled on the housing at the opposite end with respect to the end, where the housing forms the flange, the cap being cup shaped and having a bottom wall, transversal to the rolling bearing axis, and a side wall, constrained to the bottom wall, wherein
   on the housing external wall, a plurality of recesses being fixed and localized in an angular correspondence with the ribs and cooperating with a plurality of protrusions, which are movable and realized on the internal surface of the side wall of the cap for the assembling, in a dismantled way, of the cap on the housing, the cap being selectively rotatable around the rotation axis (A) of the bearing between an engagement position, in which the cap is solidly constrained to the housing, and a disassembly position, in which the cap is detachable from the housing.

2. The assembly according to claim 1, wherein the plurality of recesses and the plurality of protrusions are each in a number of four and are angularly equally spaced of 90°.

3. The assembly according to claim 1, wherein the engagement position is obtained by the angular correspondence of a cut "CLOSE" of the cap with a cylindrical rib of the housing, wherein the cut "CLOSE" angularly corresponds to one of the plurality of protrusions.

4. The assembly according to claim 1, wherein the disassembly position is obtained by the angular correspondence of a cut "OPEN" of the cap with a cylindrical rib of the housing.

5. The assembly according to claim 4, wherein the angular distance between the cut "CLOSE" and the cut "OPEN" is equal to 30°.

6. The assembly according to claim 4, wherein the cap includes a plurality of external reference teeth, each of them located in an angular correspondence with one of the plurality of protrusions or with the cut "OPEN".

7. The assembly according to claim 1, wherein the transverse bottom wall of the cap comprises a protruded hexagonal portion for allowing a wrench to carry out engagement and disassembly operations of the cap with respect to the housing.

\* \* \* \* \*